United States Patent [19]

Shirakawa

[11] Patent Number: 4,989,629
[45] Date of Patent: Feb. 5, 1991

[54] FUEL CUT VALVE FOR VENT LINE

[75] Inventor: Toshihiro Shirakawa, Kanagawa, Japan

[73] Assignee: Nissan Motor Co., Ltd., Japan

[21] Appl. No.: 376,500

[22] Filed: Jul. 7, 1989

[30] Foreign Application Priority Data

Jul. 7, 1988 [JP] Japan ............................... 63-89460[U]

[51] Int. Cl.⁵ .............................................. F16K 31/22
[52] U.S. Cl. ...................................... 137/202; 137/433
[58] Field of Search ............... 137/202, 587, 588, 433; 220/85 VS

[56] References Cited

U.S. PATENT DOCUMENTS

| | | | |
|---|---|---|---|
| 2,313,773 | 3/1943 | Samiran | 137/202 |
| 2,781,218 | 11/1988 | Mori | 137/202 |
| 2,872,298 | 2/1959 | Van Loenen | 137/202 X |
| 3,910,302 | 10/1975 | Sudhir | 137/202 X |

Primary Examiner—Alan Cohan
Attorney, Agent, or Firm—Pennie & Edmonds

[57] ABSTRACT

A fuel cut valve generally comprises a valve housing mounted on an interior of a fuel tank. A hollow passage means is provided for establishing gas communication between the interior of the valve housing and a vent line connected to an engine induction system. The hollow passage means defines a gaseous fuel passage extending horizontally through the housing so that the vent line can be oriented in horizontal alignment to be connected with the hollow passage means.

18 Claims, 3 Drawing Sheets

FUEL CUT VALVE FOR VENT LINE

BACKGROUND OF THE INVENTION

1. Field of the Invention

The present invention relates generally to a fuel cut valve for a vent line in a fuel system for an internal combustion engine. More specifically, the invention relates to a fuel level responsive fuel cut valve to be installed within a fuel tank for ventilating vaporized fuel from the tank.

2. Description of the Background Art

Such fuel cut valves have been disclosed in U.S. Pat. No. 3,910,302 and Japanese Utility Model First (unexamined) Publication (Jikkai) Showa No. 62-17423. In U.S. Pat. No. 3,910,302, the fuel cut valve is provided in the inner end of a vent line for ventilating vaporized fuel gas to an intake manifold of an internal combustion engine. Normally, the fuel cut valve of this type is oriented above a normal fuel level in the fuel tank. The fuel cut valve has a fuel level responsive valve element which is disposed within a valve housing and is normally maintained at an open position. The valve element is designed to move in response to extraordinarily high fuel level to shut the vent line so that the fuel will never flow therethrough.

In such a construction, the vent line has to be connected to the valve housing at the top. This clearly requires extra clearance at the upper portion of the fuel tank, which limits the fuel tank capacity. This is especially true for the modern vehicle, where height of the fuel tank is strictly limited by the fuel tank being oriented below the rear passenger's seat. Similar drawbacks appear in the Jikkai Showa No. 62-17423.

SUMMARY OF THE INVENTION

Therefore, it is an object of the present invention to provide a fuel cut valve which requires much less top clearance within the fuel tank and thus can significantly increase the capacity of the tank.

Another object of the invention is to provide a mounting structure for a fuel cut valve which may assure closure of a vent line upon emergency and thus assure blocking of fuel flow through the vent line.

A further object of the invention is to provide a valve construction which may assure leakage of the fuel through the vent line during ventilation of vaporized fuel to an engine induction system.

In order to accomplish the aforementioned and other objects, a fuel cut valve, according to the present invention, comprises a valve housing mounted on an interior of a fuel tank. A hollow passage means is provided for establishing gas communication between the interior of the valve housing and a vent line connected to an engine induction system. The hollow passage means defines a gaseous fuel passage extending horizontally through the housing so that the vent line can be oriented in horizontal alignment to be connected with the hollow passage means. According to one aspect of the invention, a fuel cut valve for gaseous fuel ventilation system of a fuel system for an automotive internal combustion engine, comprises:

a valve housing defining a hollow space therein and being in fluid communication with an interior space of a fuel tank for introducing gaseous state fuel vapor;

a vent path means having a first horizontally extending section defined in the valve housing for fluid communication with the hollow space of the valve housing via a communication opening, a second horizontally extending section provided at an offset position relative to the first horizontally extending section, and a third section establishing communication between the first and second horizontally extending sections; and a valve means, associated with the communication opening for opening and closing the latter in response to the level of fuel in the fuel tank in order to permit the gaseous state fuel to flow through the vent path and block the liquid state fuel from flowing into the vent path.

The first horizontally extending section of the vent path may be located in the vicinity of the upper end of the interior space of the fuel tank. Above the hollow space of the valve housing the communication opening is formed through upper horizontal wall of the valve housing. Preferably, the first horizontally extending section is formed within the upper horizontal wall of the valve housing.

The second horizontally extending section may be located at a position vertically offset from the first horizontally extending section. In the preferred construction, the second horizontally extending section is located at lower elevation than that of the first horizontally extending section. Also, the third section may be formed through a side wall of the valve housing.

The valve means may comprise a buoyancy element and a valve body movable in a cooperative fashion, with the buoyancy element normally positioning the valve body away from the communication opening for establishing fluid communication between the hollow space of the valve housing and the first horizontally extending section of the vent path. The buoyancy element responds to the liquid fuel level rising beyond a predetermined level by moving the valve body into a position for blocking fluid communication through the communication opening. Preferably, the valve body has a valve head having a overhung structure for preventing the liquid state fuel from flowing into the communication opening with the flow of the gaseous state fuel.

The fuel cut valve may be mounted on the ceiling wall of the fuel tank by means of a mounting structure which is responsive to an externally exerted impact for releasing the fuel cut valve from the mounting structure for protection. The mounting structure comprises a flange integrally formed with the valve housing, and the flange is provided with a weakened section for causing breakage in response to the externally exerted impact, and a flange support provided on the ceiling wall of the fuel tank for supporting the flange.

According to another aspect of the invention, a valve structure for a fuel cut valve for gaseous fuel vapor ventilation system of a fuel system for an automotive internal combustion engine, including a valve housing defining a hollow space therein and being in fluid communication with an interior space of a fuel tank for introducing gaseous state fuel; a vent path means being provided in fluid communication with the hollow space of the valve housing via a communication opening, for ventilating gaseous state fuel; and a valve means, associated with the communication opening for opening and closing the latter in response to the level of fuel in the fuel tank in order to permit the gaseous state fuel to flow through the vent path and block the liquid state fuel from flowing into the vent path, wherein the valve structure comprises:

a buoyancy element and a valve body movable in a cooperative fashion, the buoyancy element normally positioning the valve body away from the communication opening for establishing fluid communication between the hollow space of the valve housing and the first horizontally extending section of the vent path, the buoyancy element responds to the liquid fuel level rising beyond a predetermined level by moving the valve body into a position blocking fluid communication through the communication opening. The valve body valve head has an overhung structure for preventing the liquid fuel from flowing into the communication opening with the flow of the gaseous state fuel.

In this case, the valve head is formed in an essentially mushroom shape configuration and has its circumferential edge portion turned downwardly in order to create downward flow of the liquid fuel.

According to a further aspect of the invention the mounting structure for mounting the above described fuel cut valve on the ceiling wall of the fuel tank, comprises:

a mounting structure which is responsive to an externally exerted impact for releasing the fuel cut valve from the mounting structure for protection, the mounting structure comprises a flange integrally formed with the valve housing, which flange is provided a weakened section for causing breakage in response to the externally exerted impact, and a flange support provided on the ceiling wall of the fuel tank for supporting the flange.

The weakened section may comprise a thin section formed in the vicinity of the intersection between the valve housing and the flange. Further preferably, the thin section is formed by a groove.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
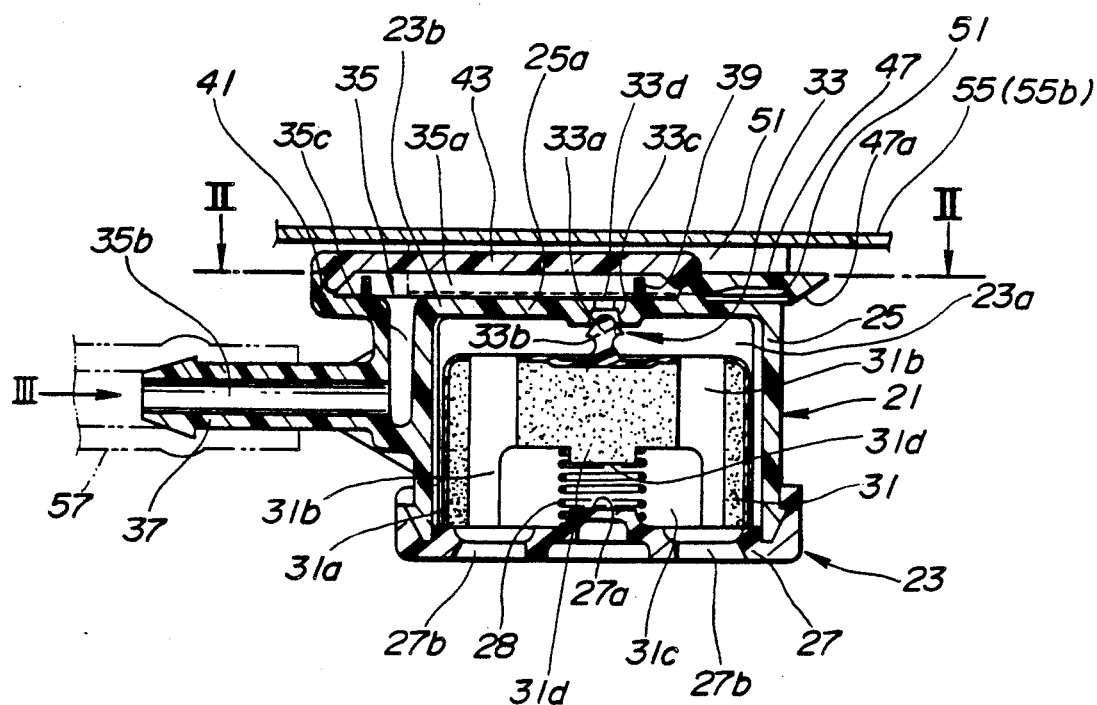
FIG. 1 is a section of the preferred embodiment of a fuel cut valve according to the present invention.

Referring now to the drawings, particularly to FIG. 1, an overall structure of the preferred embodiment of a fuel cut valve, according to the present invention, is generally represented by the reference numeral 21. The fuel cut valve 21 generally made of a synthetic resin in essentially overall structure. The fuel cut valve 21 includes an essentially cylindrical housing 23 which has a cylindrical side wall 25 and an upper wall section 25a extending from the top end of the side wall 25. A bottom closure 27 is engaged to the lower end of the side wall 25 for defining a valve chamber 23a. The bottom closure 27 is formed with one or more openings 27b for establishing fluid communication between the inside and the outside of the valve housing 23.

An essentially cylindrical float body 31 is disposed within the valve chamber 23b for reciprocation therein. The float body 31 has a relatively hard outer cover layer 31a and a foamed body 31b filled interior of the outer cover layer and made of a foamed synthetic resin. The foamed body 31e is formed with one or more axially extending through openings 31b for free communication of the fuel therethrough. The foamed body 31e is also formed with a recess 31c at the center portion of the lower end. The recess 31c extends over the lower ends of the through openings 31b.

A pre-loading spring 28 is received within the recess 31c of the foamed body 31e. The upper end of the spring 28 is seated on a projection 31d extending from the bottom plane of the recess 31c. On the other hand, the lower end of the spring 28 is seated on a spring seat projection 27a extending from the bottom closure 27. The spring 28 is provided a spring force small enough not to move the float body 31 in the normal state.

A valve body 33 is carried by the float body 31 and extends upwardly from the upper end plane of the latter. The valve body 33 has a valve head 33a. The valve head 33a opposes to a discharge opening 33d formed through the upper wall 25a and communicated with a horizontally extending section 35a of a vent path 35. An annular valve seat 33c is formed around the lower end of the discharge opening 33d so as to receive the valve head 33a when the valve body 33 with the float body 31 is moved upwardly in response to rising of the fuel level.

Figure 4:
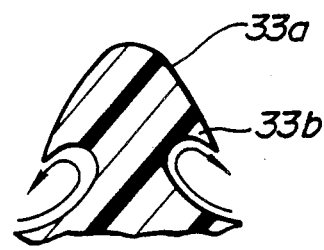
FIG. 4 is an enlarged section of a valve head employed in the preferred embodiment of the fuel cut valve of FIG. 1.

The valve head 33a is formed into a generally mushroom shaped configuration, as shown in FIG. 4. The valve head 33a has a circumferential edge section 33b which is turned for directing the liquid state fuel as shown by arrows. Though the circumferential edge section 33b is not necessary to be shaped as shown, it is advantageous to form into the shown configuration so that the liquid state fuel drawn with the gaseous fuel into the discharge opening 33d is effectively returned.

The vent path 35 has a vertically extending section 35c communicated with the horizontally extending section 35a set forth above. The vent path 35 further has a section 35b extending through a connector pipe section 37 which is integrally formed with the valve housing 23 and extends horizontally at a level lower than the level of the horizontally extending section 35a. The connector pipe section 37 is adapted to engage with a vent line tube 57 which is connected to an intake manifold of the engine induction system.

Figure 2:
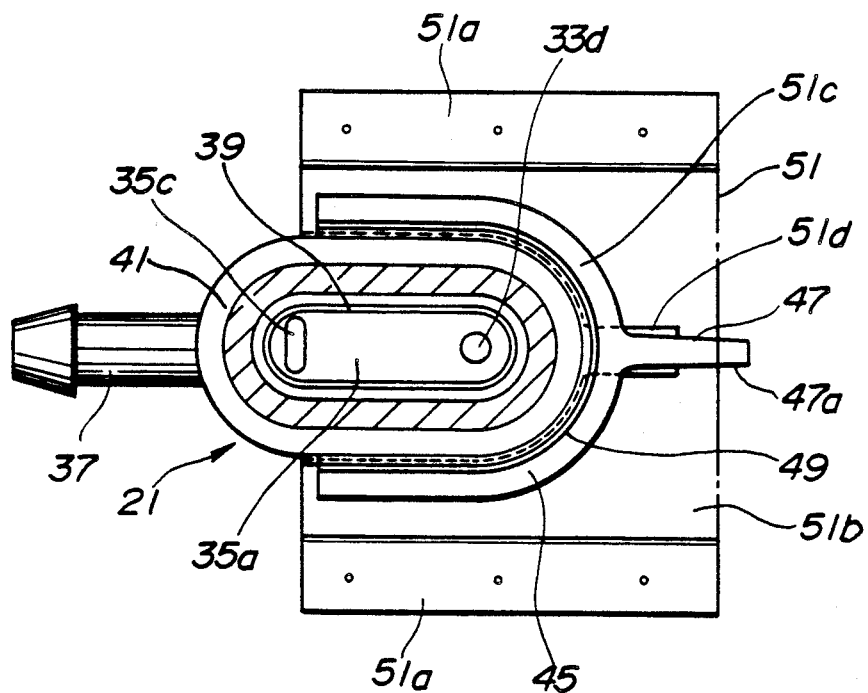
FIG. 2 is a section taken along line II—II of FIG. 1.

As seen from FIG. 1, the upper wall section 25a is formed of an upper wall 23b integrally formed with the side wall 25. The upper wall 23b has an annular flange 41 extending upwardly from the circumferential edge, and an annular upward projection 39 coaxially arranged with the flange. A cover plate 43 is fitted onto the upper wall 23b for forming the upper wall section 25a and defining the aforementioned horizontally extending section 35a of the vent path 35. As particularly shown in FIG. 2, a horizontal flange 45 extends from the annular flange 41 except for the portion which is oriented at the portion corresponding to the connector pipe 37. The horizontal flange 45 is thus arranged in parallel and spaced apart relationship with the upper wall 23b. A horizontal extension 47 with a hooking claw 47a is formed with the horizontal flange 45 as shown in FIGS. 1 and 2. Furthermore, the flange 45 is formed with a notched groove 49 on the upper surface thereof.

Figure 3:
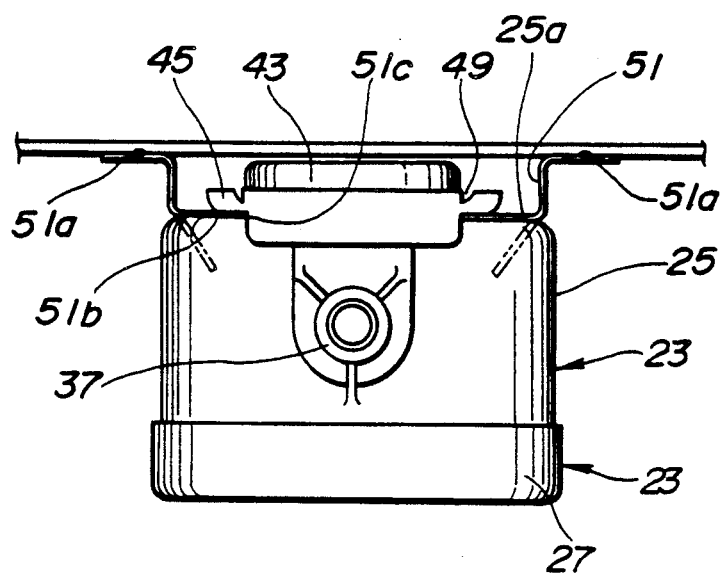
FIG. 3 is a side elevation of the preferred embodiment of the fuel cut valve which is shown in a form installed onto the interior of a fuel tank by the preferred construction of a fuel cut valve mounting structure according to the invention.

The fuel cut valve 21 as constructed above is mounted or installed on the upper ceiling wall of a fuel tank body by means of a holder 51 in a manner as shown in FIGS. 2 and 3. The holder 51 is generally formed with a relatively shin plate and bent into a form as shown in FIG. 3 to have a pair of upper flange section 51a defined at both lateral end portions and adapted to be rigidly fixed onto the lower surface of the upper ceiling wall of the fuel tank by way of welding or so forth. The lower horizontal section 51b of the holder 51 is formed with an essentially U-shaped one end open cut-out 51c for receiving the annular flange 41 of the valve housing 23. At the installed condition, the horizontal flange 45 of the valve housing 23 is mounted on the circumferential edge portion of the U-shaped cut-out 51 in a manner shown in FIG. 3. At the same time, the hooking claw 47a of the extension 47 engages with the lateral edge of the holder 51 so as to retain the valve housing 23 in place.

Figure 5:
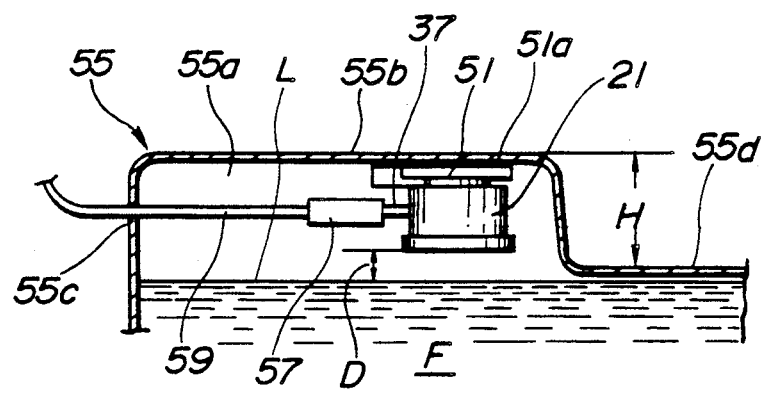
FIG. 5 is a section of a fuel tank employing the preferred embodiment of the fuel cut valve of FIG. 1.

After installing on the interior of the fuel tank, the vent path 35 is connected to the vent line by connecting the connector pipe 37 to a vent line tube 59 via a coupling hose 57 which is formed of an oil proof rubber, as shown in FIG. 5.

With the construction set forth above, since the upper limit of the fuel level is set below the orientation of lower end of the fuel cut valve 21 with leaving a clearance D, as shown in FIG. 5.

In the normal state, in which the fuel level is maintained below the position of the fuel cut valve, the float body 31 with the valve body 33 is maintained at the lowered position to seat on the bottom closure 27. At this condition, the vaporized or gaseous fuel is introduced into the interior of the valve housing 23 via the openings 27b of the bottom closure 27. The gaseous fuel is then drawn through the openings 31b of the float body 31 to flow into the vent path 35 via the discharge opening 33d. Therefore, gaseous state fuel can be ventilated via the vent line. Here, as in the known art, when the engine is running, the gaseous fuel introduced into the vent line 59 is introduced into the intake manifold of the induction system of the engine via a check valve and a canister. On the other hand, while the engine is not running, the gaseous fuel can be absorbed by absorbent in the canister.

On the other hand, if the fuel level has risen beyond the upper limit level and reaches the fuel cut valve, the liquid state fuel enters into the interior of the valve housing 23. By this, the float body 31 is moved upwardly, carrying the valve body 33 by buoyancy in aid of the spring force of the spring 28. Therefore, the valve head 33a of the valve body 33 sealingly seats on the valve seat 33c to block fluid communication between the interior of the valve housing 23 and the vent path 35 via the discharge opening 33d. After lowering of the fuel level, the float body 31 with the valve body 33 moves downwardly to open the discharge opening 33d. Then, the gaseous fuel which is compressed by rising of the fuel level rushes to the discharge opening. Therefore, the liquid state fuel remained within the valve housing 23 is drawn toward the discharge opening by relatively high velocity and high pressure flow of the gaseous fuel. At this time the specific configuration of the valve head 33a of the valve body is effective for returning the liquid state fuel to prevent it from entering into the vent path 35.

It should be noted that the shown embodiment is successful in reducing the height of the fuel cut valve, the level of the upper limit of the fuel level is much higher than that in the conventional tanks. Therefore, the capacity of the fuel tank can be significantly increased without causing increasing of the height of the fuel tank. In other words, in order to achieve a desired capacity of the tank, smaller height of the tank will be required by employing the fuel cut valve according to the present invention.

In addition, in the shown construction, the flange 45 for mounting the fuel cut valve 21 on the holder 51 is weakened at the portion of the notched groove 49 so as to cause concentration of the stress when the external force is exerted on the fuel cut valve due to accident or so forth. Therefore, the flange is broken to be released from the holder 51. This is successful for protecting the fuel cut valve from the externally exerted impact. Therefore, even at the accident, blocking of the fuel from the vent line can be achieved for assure safety.

Therefore, the present invention can fulfill all objects and advantages sought therefor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A fuel cut valve for gaseous fuel ventilation system of a fuel tank for an automotive internal combustion engine, comprising:
    a valve housing, attached by a mounting structure to an interior calling surface of said fuel tank, defining a hollow space therein and being in fluid communication with an interior space of a fuel tank for introducing gaseous state fuel;
    a vent path means having a first horizontally extending section defined in said valve housing for fluid communication with the hollow space of said valve housing via a communication opening, a second horizontally extending section provided at offset position relative to said first horizontally extending section, and a third section establishing communication between said first and second horizontally extending sections;
    a valve means, associated with said communication opening for opening and closing the latter in response to the level of fuel in said fuel tank in order to permit the gaseous state fuel to flow through said vent path and block the liquid state fuel from flowing into said vent path.

2. A fuel cut valve as set forth in claim 1, wherein said first horizontally extending section of said vent path is located in the vicinity of the upper end of said interior space of said fuel tank and above said hollow space of said valve housing and said communication opening is formed through upper horizontal wall of said valve housing.

3. A fuel cut valve as set forth in claim 2, wherein said first horizontally extending section is formed within said upper horizontal wall of said valve housing.

4. A fuel cut valve set forth in claim 1, wherein said second horizontally extending section is located at a position vertically offset from said first horizontally extending section.

5. A fuel cut valve as set forth in claim 4, wherein said second horizontally extending section is located at lower elevation than that of said first horizontally extending section.

6. A fuel cut valve as set forth in claim 4, wherein said third section is formed through a side wall of said valve housing.

7. A fuel cut valve as set forth in claim 1, wherein said valve means comprises a buoyancy element and a valve body movable in cooperative fashion, said buoyancy element being normally position said valve body away from said communication opening for establishing fluid communication between said hollow space of said valve housing and said first horizontally extending section of said vent path and responsive to liquid state fuel level risen beyond a predetermined level to move said valve body into a position for blocking fluid communication through said communication opening.

8. A fuel cut valve as set forth in claim 7, wherein said valve body has a valve head having a overhung structure for preventing the liquid state fuel from flowing into said communication opening with the flow of the gaseous state fuel.

9. A fuel cut valve as set forth in claim 1, which is mounted on the ceiling wall of said fuel tank by means of a mounting structure which is responsive to an externally exerted impact for releasing the fuel cut valve from the mounting structure for protection.

10. A fuel cut valve as set forth in claim 9, wherein said mounting structure comprises a flange integrally formed with said valve housing, which flange is provided a weakened section for causing breakage in response to the externally exerted impact, and a flange support provided on the ceiling wall of said fuel tank for supporting said flange.

11. A valve structure for a fuel cut valve for gaseous fuel ventilation system of a fuel tank for an automotive internal combustion engine, including a valve housing, attached by a mounting structure to an interior ceiling surface of said tank, defining a hollow space therein and being in fluid communication with an interior space of a fuel tank for introducing gaseous state fuel; a vent path means being provided in fluid communication with the hollow space of said valve housing via a communication opening, for ventilating gaseous state fuel; and a valve means, associated with said communication opening for opening and closing the latter in response to the level of fuel in said fuel tank in order to permit the gaseous state fuel to flow through said vent path and block the liquid state fuel from flowing into said vent path,
said valve structure comprising:
a buoyancy element and a valve body movable in cooperative fashion, said buoyancy element normally positioning said valve body away from said communication opening for establishing fluid communication between said hollow space of said valve housing and said first horizontally extending section of said vent path and responsive to liquid state fuel level being above a predetermined level to move said valve body into a position for blocking fluid communication through said communication opening, and said valve body having a valve head having a overhung structure for preventing the liquid state fuel from flowing into said communication opening with the flow of the gaseous state fuel.

12. A valve structure as set forth in claim 11, wherein said valve head is formed in to an essentially mushroom shape configuration and has circumferential edge portion turned downwardly in order to create downward flow of the liquid state fuel.

13. A mounting structure for a fuel cut valve for gaseous fuel ventilation system of a fuel system for an automotive internal combustion engine, which fuel cut valve including a valve housing defining a hollow space therein and being in fluid communication with an interior space of a fuel tank for introducing gaseous state fuel; a vent path means being provided in fluid communication with the hollow space of said valve housing via a communication opening, for ventilating gaseous state fuel; and a valve means, associated with said communication opening for opening and closing the latter in response to the level of fuel in said fuel tank in order to permit the gaseous state fuel to flow through said vent path and block the liquid state fuel from flowing into said vent path, wherein the mounting structure for mounting the fuel cut valve on the ceiling wall of said fuel tank, comprising:
a mounting structure which is responsive to an externally exerted impact for releasing the fuel cut valve from the mounting structure for protection, said mounting structure comprises a flange integrally formed with said valve housing, which flange is provided a weakened section for causing breakage in response to the externally exerted impact, and a flange support provided on the ceiling wall of said fuel tank for supporting said flange.

14. A mounting structure as set forth in claim 13, wherein said weakened section comprises a thin section formed in the vicinity of the intersection between said valve housing and said flange.

15. A mounting structure as set forth in claim 14, wherein said thin section is formed by a groove.

16. A valve for blocking the flow of liquid fuel through a ventilating path between the interior and exterior of a fuel tank of an internal combustion engine vehicle, comprising:
a valve housing mounted, by a mounting means, on an interior ceiling surface of said fuel tank, said valve housing including a housing path defining a segment of said ventilation path;
a valve means associated with said housing for opening and closing said housing path in response to the level of fuel in said tank so as to permit fuel vapor flow out of said fuel tank through said ventilation path and block liquid fuel flow from said fuel tank through said ventilation path, said mounting means including a release means, responsive to an externally exerted impact, for releasing said fuel cut valve from said mounting means for protection.

17. A valve for blocking the flow of liquid fuel through a ventilating path between the interior and exterior of a fuel tank of an internal combustion engine vehicle according to claim 16, wherein said mounting means comprises a flange fixedly attached to said valve housing and a flange support attached to said interior surface of said fuel tank for supporting said flange, sand said release means comprises a weakened section of said flange which breaks in response to said externally exerted impact.

18. A valve for blocking the flow of liquid fuel through a ventilating path between the interior and exterior of a fuel tank of an internal combustion engine vehicle, comprising:
  a valve housing mounted, by a mounting means, on an interior ceiling surface of said fuel tank, said valve housing including a housing path defining a segment of said ventilation path;
  a valve means associated with said housing for opening and closing said housing path in response to the level of fuel in said tank so as to permit fuel vapor flow out of said fuel tank through said ventilation path and block liquid fuel flow from said fuel tank through said ventilation path, said valve means including
  a buoyancy element and a valve body cooperatively moved by said buoyancy element into and out of a portion of said housing path in response to the level of fuel in said tank, such that when said level is above a predetermined level said valve body blocks fluid from passing through said housing path, and when said level is below said predetermined level said valve body permits ready flow of fuel vapor into said housing path, said valve body having a valve head formed in an essentially mushroom shape, with a circumferential edge portion downwardly turned to cause a downward flow of liquid fuel and thereby prevent said liquid fuel from flowing into said housing path with said vaporized fuel.

* * * * *